TREE UPROOTING ATTACHMENT FOR BULLDOZERS

Original Filed Jan. 15, 1951 2 Sheets-Sheet 1

William A. Winget
INVENTOR.

BY Thomas A. O'Brien and Harvey B. Jacobson
Attorneys

Nov. 9, 1954 W. A. WINGET Re. 23,895

TREE UPROOTING ATTACHMENT FOR BULLDOZERS

Original Filed Jan. 15, 1951 2 Sheets-Sheet 2

William A. Winget
INVENTOR.

BY Clarence A. O'Brien and Harvey B. Jacobson
Attorneys

United States Patent Office

Re. 23,895
Reissued Nov. 9, 1954

23,895

TREE UPROOTING ATTACHMENT FOR BULLDOZERS

William A. Winget, Lima, Ohio

Original No. 2,663,952, dated December 29, 1953, Serial No. 205,971, January 15, 1951. Application for reissue July 6, 1954, Serial No. 441,700

5 Claims. (Cl. 37—2)

Matter enclosed in heavy brackets [ ] appears in the original patent but forms no part of this reissue specification; matter printed in italics indicates the additions made by reissue.

This invention relates to improvements in attachments for bulldozers and particularly to a device for use in clearing fields.

An object of this invention is to provide an attachment for a bulldozer which is arranged to employ certain standard controls of the bulldozer and which has a cutter for both vertical and horizontal roots of a tree and which is provided with a mechanism to shake and/or displace the tree by holding the trunk and then moving the jaws which have clamping contact with the tree trunk.

Ancillary objects and features of importance will become apparent in following the description of the illustrated form of the invention.

Figure 1:
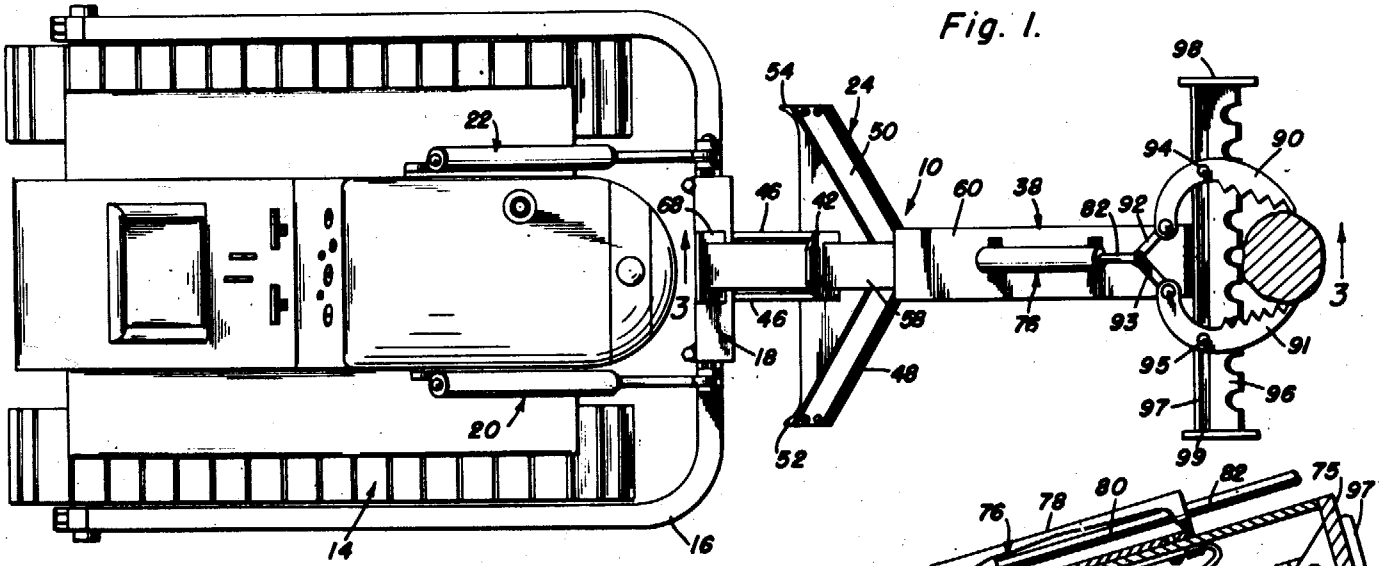
Figure 1 is a plan view of a standard bulldozer having the attachment applied thereto.

The instant attachment 10 for the standard bulldozer 14 is arranged to be attached to the frame 16 thereof by means of a box clamp 18 which is bolted or otherwise fastened in place. Accordingly, the attachment may be raised and lowered in accordance with the lifting and lowering movement of the frame 16 through the action of the fluid motors 20 and 22.

Figure 3:
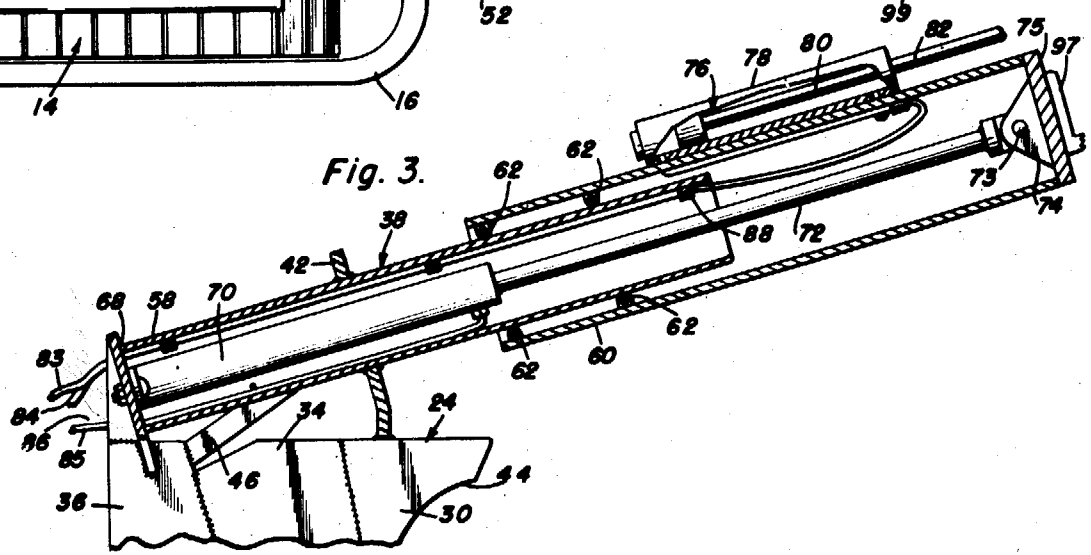
Figure 3 is an enlarged sectional view taken substantially on the line 3—3 of Figure 1, portions of the jaw and clamp assembly being omitted.

A cutter assembly 24 is operatively connected with the clamp 18 and includes a vertical cutter 30 with a rearwardly sloping cutting edge 32, and the vertical cutter 30 is welded to the support 34. This support (Figure 3) is welded to a rear plate 36 having the back part of a telescopic boom 38 fixed, as by welding, thereto. Brackets 40 on each side of the support 34 are fixed to the bottom part of the clamp 18 and are held in place by standard means, as welding. A support 42 has the telescopic boom 38 fixed to it and the lower end of the support is welded to the top part of the cutter above the frontal recess 44 therein which is employed for the purpose of rolling logs. Bracing 46 is used to help hold the support 42, and other bracing may be used wherever it is found expedient or necessary.

Figure 2:
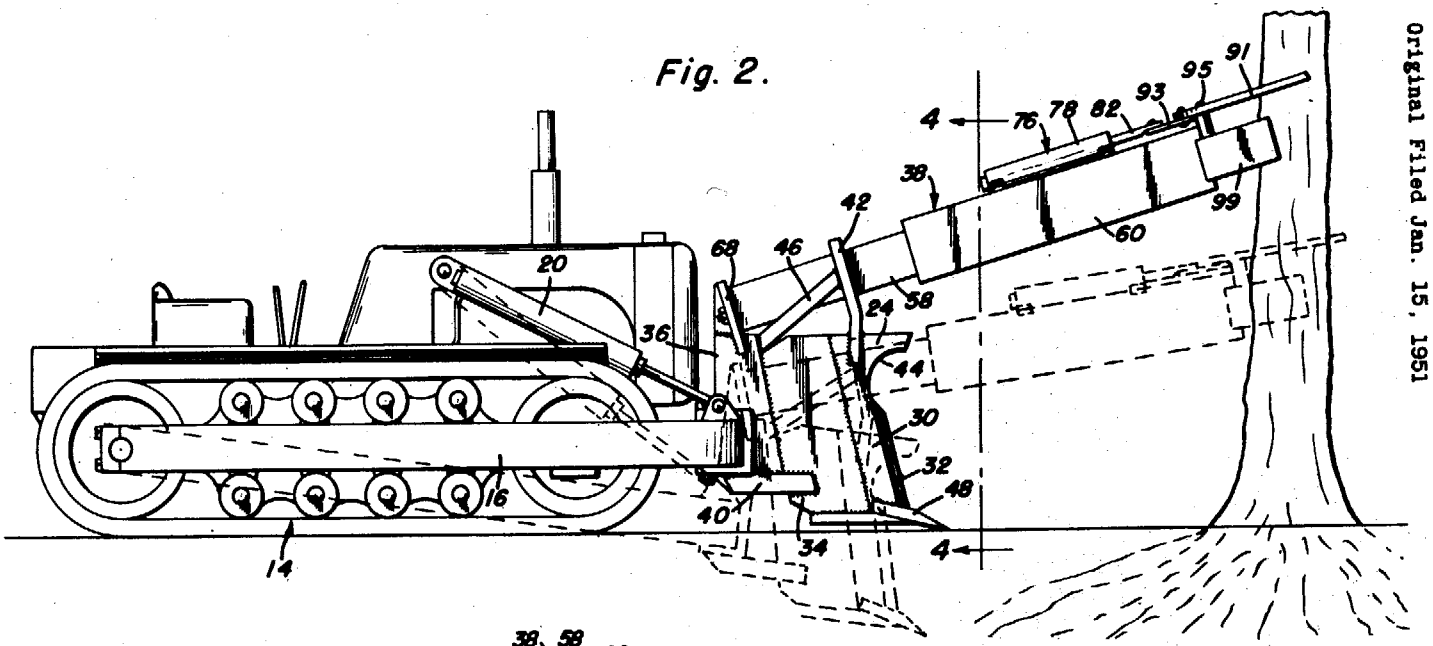
Figure 2 is an elevational view of the device shown in Figure 1.
Figure 4:
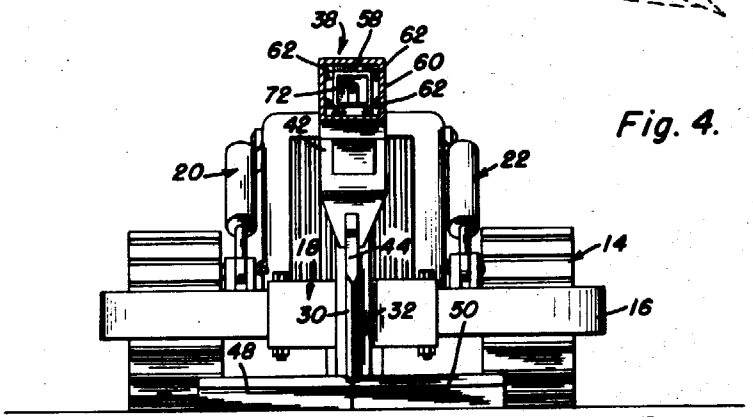
Figure 4 is a sectional view taken substantially on the line 4—4 of Figure 2 and in the direction of the arrows.

Rearwardly diverging horizontal or substantially horizontal cutters 48 and 50 are fixed to the lower end of the blade 30 and are provided with deflector hooks 52 and 54 at the outer ends thereof. The vertical cutter 30 is adapted to sever horizontal roots of a tree (Figure 2) while the horizontal cutters are adapted to sever vertical roots. Roots which are not truly vertical or horizontal are severed by either or both of the cutter assemblies.

The boom 38 includes an inner sleeve 58 which is preferably square in cross-section and an outer sleeve 60 of considerably larger diameter so that the rollers 62 may hold the sleeves spaced from each other for facility of sliding movement of the sleeves with respect to each other. The rollers 62 may be carried by either of the sleeves; however, they are illustrated as being attached to the outer sleeve 60.

One end of the sleeve 58 is closed by the plate 68 while the other end is open. The plate accommodates the cylinder 70 of a hydraulic motor or ram of the double acting type, and the piston rod 72 thereof is attached by means of the pivot pin 73 to the bracket 74 which is mounted on the closure plate 75 of the sleeve 60. Accordingly, through the action of the hydraulic motor the sleeves may be extended or retracted with respect to each other.

A second fluid motor 76 is bolted or otherwise rigidly fixed to the sleeve 60 and includes a cylinder 78 which is provided with a piston 80 having the piston rod 82 extending from the cylinder. Hoses 83 and 84 are used to feed the motor 76, while the hoses 85 and 86 are operatively connected with the cylinder 70. The hoses 83 and 84 are passed through the bore of the sleeve 58 and held in place by means of a clamp 88 and then extend through suitable apertures in the sleeve 60 for communication with ports in the cylinder 78. An ample supply of hose is provided to allow the telescopic boom to be extended and retracted.

The function of the motor 76 is to operate the jaws 90 and 91 which are connected to the piston rod 82 at their inner ends by means of the links 92 and 93. The jaws are provided with teeth near the ends thereof to engage the trunk of a tree.

The jaws 90 and 91 are mounted by the pivot pins 94 and 95 which are fastened to the clamp bar 96, this clamp bar being fixed at its rear edge to the lower edge of a plate 97, welded or otherwise fixed to the closure plate 75.

There are stops 98 and 99 welded or otherwise fixed to the outer ends of the clamp bar 96 and the mounting plate 97 so as to prevent the tree from sliding off the ends of the clamp bar.

In operation the bulldozer 14 is moved to a position near a tree. The frame 16 is lowered and the bulldozer moved forward. By this action the cutters 30, 48 and 50 will sever the roots of the tree. However, prior to the severing operation, fluid under pressure is delivered by standard controls from the bulldozer and from a standard supply and source of the bulldozer into the cylinder 70 causing the sleeve 60 of the boom 38 to be extended. When the clamp bar 96 contacts the tree, the jaws 90 and 91 may be operated by applying fluid under pressure to the motor 76. The fluid in the cylinder 70 may be released by the bulldozer controls after the jaws 90 and 91 grasp the tree whereby the boom 38 is held extended mainly by friction and secondarily by the action of the jaws 90 and 91 clamping on the tree. As the bulldozer moves forward so that the cutter assembly 24 severs at least some of the tree roots, the boom is allowed to retract, but the jaws 90 and 91 prevent the tree from ever toppling over in any direction. Accordingly, the tree may be held while the roots are being severed and after the roots are severed.

To remove a tree without using the cutters, it is necessary only to lift the boom 38 and grasp it with the jaws 90 and 91. Then by applying fluid under pressure into the cylinder 70, the tree trunk may be moved forwardly and rearwardly to pull up the tree.

Having described the invention, what is claimed as new is:

1. In combination with the pivotal frame of a bulldozer, an attachment comprising a clamp connected to the frame, a longitudinally extensible boom with means fastening said boom with means fastening said boom to said clamp, telescopic means rigidly secured to said clamp for extending and retracting said boom, a jaw assembly including a fixed cross bar and a pair of jaws carried by said boom, a fluid motor connected to said jaws to maintain their gripping hold on a tree trunk, and a root cutter connected to said clamp and located below said boom for cutting roots of a tree gripped by said jaws as the boom is retracted during movement of the bulldozer towards the jaws.

2. The combination of claim 1, and said extensible boom including two sleeves which are telescopically arranged, said sleeves being non-circular in cross-sectional shape, and rollers separating said sleeves from each other and holding said sleeves in a definite spaced relationship.

3. A bulldozer attachment comprising a clamp adapted to be fastened to a part of a bulldozer, a root cutter secured to the clamp, an extensible boom fastened to the clamp and including forward and rear members, a clamp bar fixed to the forward member, a pair of jaw members pivotally secured to the ends of the clamp bar, a fluid motor carried by the boom and connecting the forward and rear members for extending the boom, and a second fluid motor carried by the boom in parallel with the first fluid motor and connected to said jaw members for maintaining their gripping hold on a tree whose roots are severed by said cutter, said root cutter and said jaw members acting in unison to remove the tree gripped by said jaw members.

*4. An attachment for a bulldozer or similar machine having a vertically movable tool supporting member comprising; a rigid metal plate adapted to be vertically disposed; means for securing the rear portion of said plate rigidly to said member with the upper and lower portions of said plate extending respectively above and below said member; a vertically disposed cutter substantially centrally disposed along the front portion of the plate and rigid therewith; a horizontally disposed cutter rigid with said plate directly below said vertically disposed cutter and having outwardly and rearwardly diverging cutting edges; a single longitudinally extending tree pusher boom having an outer end projecting forwardly of the plate above and beyond said cutters, the longitudinal axis of said boom lying generally in the same vertical plane with said vertical cutter, said boom having an inner end rigid with the*

*upper portion of the plate, thereby to provide a rigid reinforced unitary structure; and a tree-engaging member on the outer end of said boom.*

*5. The combination claimed in claim 4, said tree-engaging member comprising a forwardly opening socket on the outer end of said boom.*

References Cited in the file of this patent or the original patent

| | | |
|---|---|---|
| 1,319,058 | Fitzpatrick | Oct. 21, 1919 |
| 1,919,075 | Rasmussen | July 18, 1933 |
| 1,972,281 | Walling | Sept. 4, 1934 |
| 2,191,048 | Tims | Feb. 20, 1940 |
| 2,295,458 | Edwards | Sept. 8, 1942 |
| 2,414,994 | Wright | Jan. 28, 1947 |
| 2,462,314 | Fuqua | Feb. 22, 1949 |
| 2,505,923 | Taylor et al. | May 2, 1950 |
| 2,508,284 | Oliver | May 16, 1950 |
| 2,535,099 | Slick | Dec. 26, 1950 |
| 2,542,952 | White | Feb. 20, 1951 |

OTHER REFERENCES

Publication: Henry A. Mullin, January 16, 1950, "The Mullin Brush and Rooter Tooth, Snag Pusher and Front End Root Cutter."